March 16, 1937.     W. G. JOHNSON ET AL     2,073,615
METHOD FOR THE PRODUCTION OF TILES
Filed June 17, 1935

INVENTORS
Walden G. Johnson
Richard C. Zapfe
BY Joseph F. Westall
ATTORNEY.

Patented Mar. 16, 1937

2,073,615

UNITED STATES PATENT OFFICE 2,073,615

METHOD FOR THE PRODUCTION OF TILES

Walden G. Johnson and Richard C. Zapfe, Pomona, Calif., assignors to Pomona Tile Manufacturing Company, Pomona, Calif., a corporation of California Application June 17, 1935, Serial No. 27,008

2 Claims. (Cl. 25—156)

This invention relates generally to the manufacture of ceramic products and particularly of tile of the kind commonly used for walls, wainscoting, drain-boards, mantels, and the like, and specifically to means and methods of fabricating ceramic articles from a dust body containing from five per cent to ten per cent moisture.

Tiles of the character referred to have been commonly formed by placing a sufficient amount of clay body or mixture in a matrix of any desired form, and then by pressure of die into the matrix forcing such body into the required configuration between die and matrix.

In the manufacture of certain porcelain articles, the clay body used, being plastic, is readily pressed into any desired form, the moisture of the mass facilitating a flow between die and matrix which, to a great extent equalizes pressure, so that density of the various parts of the completed article is practically uniform. However, such apparent advantages incident to the plasticity of a clay body are more than off-set by those resulting from the use of a body which contains so little moisture as to be to all appearances in the form of a dry powder, and thus, practically without ductility.

In the art prior to our invention, it has been found difficult and cumbersome to obtain a reasonable uniformity of density of parts of a ceramic article pressed from a dust body to assure a substantially uniform contraction when subjected to the heat of firing; for while sufficient uniformity may be obtained by careful distribution manually of the dust body in the matrix before subjecting to pressure, yet without such time-consuming pains necessitating considerable skill on the part of the operator, more clay will be compacted within an equal space at the bottom of the matrix than at the sides; and as such tiles or ceramic articles shrink in firing from eight per cent to twelve per cent or more, according to density, the inequal compactness will result in a variable shrinkage of different parts, frequently leaving ends bulged as well as causing other distortions and warping, resulting in considerable waste in time and material.

It is a principal object of the present invention to provide a form of die for use with a common form of matrix of the prior art, and also a method of operation, which, with a minimum of skill on the part of the operator, will compact the dust body of the tile-forming materials with much greater uniformity than heretofore in the art, thus resulting in a sufficient uniformity of shrinkage of different parts under firing to prevent undue distortion or bulging.

Another object is the provision of a simple method of roughening interior or unexposed portions of the tile so as to secure greater adhesion to the cement backing when the tile is mounted in a place of use.

Lessening expense incident to manufacture while simplifying procedure, thus eliminating necessity for the employment of costly experience and skill, while securing all the advantages above mentioned, and at the same time improving the quality of such articles, are also important objects of the present invention.

In the accompanying drawing.

Figure 1:
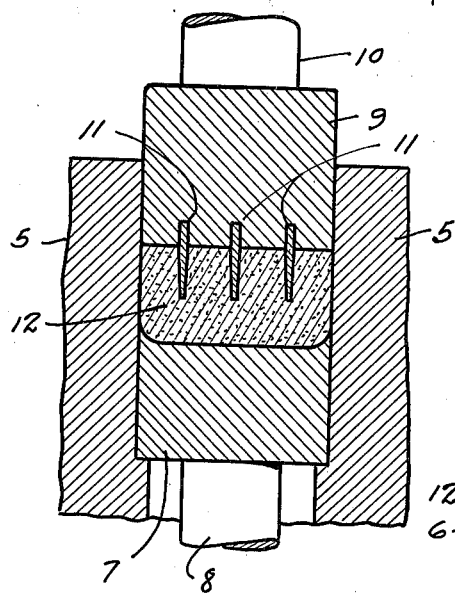
Fig. 1 is a vertical cross-section of a common form of matrix, showing the die of the present invention therein, the dust clay body being illustrated as being under compression between die and matrix.
Figure 2:
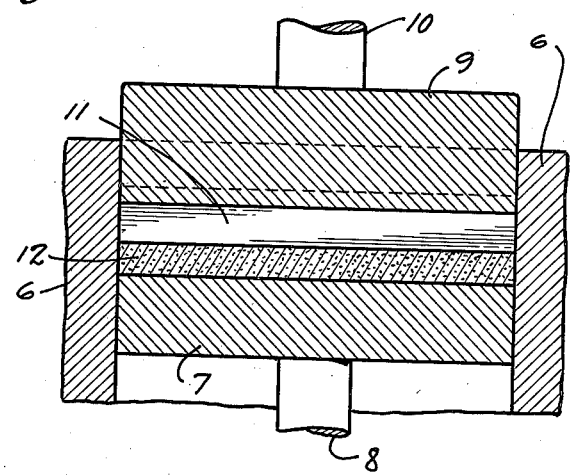
Fig. 2 is a longitudinal section on the axis of Fig. 1.
Figure 3:
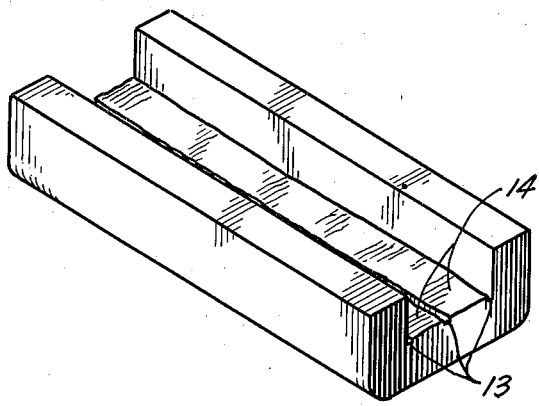
Figs. 3 and 4, are, respectively, perspective views of a tile and cap, formed by the use of the means illustrated in Figs. 1 and 2.
Figure 4:
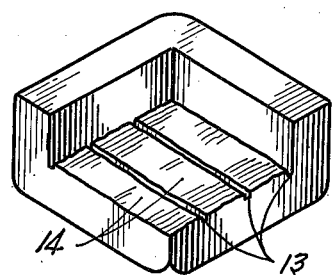

Referring specifically to the drawing, in which like numerals indicate similar parts throughout the several views, 5—5 are side walls, and 6—6 end walls of the matrix in which the die of the present invention is designed to be used. 7 is a bottom or floor of such matrix and 8 indicates a support for such floor 7. The main body of the die is indicated at 9; and 10 designates part of any suitable means (well known in the art) by which the die is pressed into the matrix. A plurality of blades 11, preferably wedge-shaped in cross section, and spaced apart, are formed integrally with the die 9, so that when in operation they will penetrate the dust body 12 when the die is pressed into the matrix.

The operation of the device and the method of procedure by which tiles are formed in accordance with the present invention are as follows: A sufficient amount of dust body material, as above generally described, which amount will be determined by ordinary skill in this art, is placed in the matrix, the die 9 with its depending blades 11 is then pressed into the tile forming material with sufficient force, (the degree of such pressure being also a matter to be determined by usual skill in this art) to form the tiles. The wedge-shaped blades 11 being thus forced into the compacted dust body, the two outer blades wedging material between their outside surfaces and the walls of the matrix, the material between the blades 11 being compacted tightly by their adjacent lateral wedging action. When sufficient pressure has been exerted to form the tile, the die with its blades 11 is withdrawn from the matrix and upon such withdrawal break off and carry between said blades a portion of the compacted dust body. Such withdrawal of the die carrying material between its blades leaves a back or interior of the tile with longitudinal impressions 13 and roughened surfaces 14, which impressions and broken surfaces provide bonding means for the cement into which the tile in use is set.

It will be understood that while we have shown a single form of our invention and but two illustrations of configurations of tiles which may be formed thereby, we do not limit ourselves to details of specific design and arrangement of parts shown in the appended drawing, nor to the configuration of forms of tiles therein illustrated, as it will be obvious to all of skill in this art that with the principle of our said invention hereby made known, application by all of skill in this art in divers forms and to the manufacture of many different ceramic articles of various contours will be readily made without departing from the principle of our invention. It will be obvious also that the wedging element for laterally compacting the dust body need not be a blade; but may be in the form of a series of studs or spikes of any of several cross-sectional contours though at a cost of efficiency and with inferior results. Various forms of matrix may be used and any suitable means for bringing the matrix and die together in proper relation to compress the dust body may be employed in the utilization of the invention herein disclosed and claimed.

What we claim and desire to cover by Letters Patent is:

1. The method of forming a roughened cement bonding surface on the interior of a ceramic article molded from a dust body which comprises placing the dust body in a matrix, forcing into said body under pressure a plurality of wedges attached to a die, and then breaking off portions of the body interposed between said wedges by the withdrawal of said wedges from the matrix.

2. The method of forming a roughened cement bonding surface on the interior of a ceramic article from a moldable body which comprises placing the body in a matrix, forcing into said body under pressure a plurality of wedges attached to a die, and then breaking off portions of the body interposed between said wedges by the withdrawal of said wedges from the matrix.

WALDEN G. JOHNSON.
RICHARD C. ZAPFE.